US008826302B2

(12) United States Patent
Casteres et al.

(10) Patent No.: US 8,826,302 B2
(45) Date of Patent: Sep. 2, 2014

(54) METHODS, SYSTEMS AND COMPUTER READABLE MEDIA FOR ESTABLISHING A COMMUNICATION LINK BETWEEN SOFTWARE SIMULATION MODELS

(71) Applicant: Airbus Operations (S.A.S.), Toulouse (FR)

(72) Inventors: Jean Casteres, Toulouse (FR); Olivier Fourcade, Toulouse (FR); Roxana Teodosiu, Toulouse (FR); Philippe Midol-Monnet, Toulouse (FR); Franck Roy, Gimont (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 13/667,624

(22) Filed: Nov. 2, 2012

(65) Prior Publication Data
US 2014/0130062 A1 May 8, 2014

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC ........................................ *G06F 9/54* (2013.01)

USPC ........................... 719/313; 719/319; 719/318

(58) Field of Classification Search
None
See application file for complete search history.

(56) References Cited

U.S. PATENT DOCUMENTS

| 2002/0159391 | A1* | 10/2002 | Demizu ..................... 370/235.1 |
| 2008/0021918 | A1* | 1/2008 | Rao ............................... 707/102 |
| 2008/0244742 | A1* | 10/2008 | Neystadt et al. ................. 726/23 |
| 2009/0306951 | A1* | 12/2009 | Paletou et al. .................. 703/13 |

* cited by examiner

*Primary Examiner* — H S Sough
*Assistant Examiner* — Craig Dorais
(74) *Attorney, Agent, or Firm* — Jenkins, Wilson, Taylor & Hunt, P.A.

(57) ABSTRACT

Methods, systems, and computer readable media for automatic connection of software simulation models, for example and without limitation, for engineering simulation use in aircraft development are disclosed. According to one aspect, a method for establishing a communication link between software simulation models includes initiating communication between the software simulation models and a publish subscribe mechanism, classifying a quality of service indicator for each of the software simulation models, comparing the quality of service indicator associated with two software simulation models, and connecting the software simulation models based on the comparison of the quality of service indicators.

20 Claims, 8 Drawing Sheets

METHODS, SYSTEMS AND COMPUTER READABLE MEDIA FOR ESTABLISHING A COMMUNICATION LINK BETWEEN SOFTWARE SIMULATION MODELS

TECHNICAL FIELD

The subject matter described herein relates generally to automatically connecting software simulation models together. More particularly, the subject matter disclosed herein relates to methods, systems, and computer readable media for establishing a communication link between software simulation models where such methods, systems and computer readable media are particularly suitable for use, for example and without limitation, for engineering simulation use in aircraft development.

BACKGROUND

Across various industries simulation environments and models are proposed in order to verify and validate system design. Simulation is used for various goals including robustness tests, functional verifications and simulated aging tests.

Currently, large corporations and entities use a wide range of large scale distributed communication middleware to support system simulations. System simulators or systems of system simulators are utilized, for example, in the Navy Surface Warfare Center (NSWC), Navy Undersea Warfare Center (NUWC), at Boeing Corporation, Lockheed Martin, General Dynamics, Northrop Grumman, and the like. Civilian usage includes systems such as CAE flight simulators series Sim XXI and the Atlantida consortium for European ATM. Notably, the various software simulations models supplied by these manufacturers are being integrated into an aircraft system integration simulator using different method processes and tools. Thus, there are difficulties involved with assembling software models with different communication capabilities.

Accordingly, there is a need for systems, methods, and computer readable media for establishing a communication link between software simulation models in system integration simulators.

SUMMARY

According to one aspect, the subject matter described herein can comprise a method for establishing a communication link between software simulation models. The method can include establishing contacts between the software simulation models and a subscription mechanism. The method also can include classifying a quality of service indicator for each of the software simulation models, comparing the quality of service indicators associated with two software simulation models, and connecting the software simulation models via the communication link based on the comparison of the quality of service indicators.

According to another aspect, the subject matter described herein comprises a system for establishing a communication link between software simulation models. The system can include a memory and a processor. The system further can include a software simulation model matching module configured to establish contacts between the software simulation models and a subscription mechanism, classify a quality of service indicator for each of the software simulation models, compare the quality of service indicators associated with two software simulation models, and connect the software simulation models via the communication link based on the comparison of the quality of service indicators.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein can include non-transitory computer readable media such as, for example and without limitation, disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings, of which.

DETAILED DESCRIPTION

In accordance with the description herein and exemplary, associated drawings, novel methods, systems, and computer readable media are disclosed for establishing a communication link between software simulation models. Such methods, systems and computer readable media are particularly suitable for use, for example and without limitation, for engineering simulation use in aircraft development.

An aircraft system integration simulator can be provided that compares quality of service indicators of software simulation models in order to establish a communication link between the software simulation models. The aircraft system integration simulator can be used to validate the integration of various aircraft functional equipment components. For example, software simulation models representing various aircraft functional equipment components can be assembled within the aircraft system integration simulator at different stages of aircraft development to simulate such integration. Communication between software simulation models can be distinguished and established by classifying the communication capabilities of the respective software simulation models. According to one aspect, the communication capabilities of a software simulation model can be characterized by three paradigms. The three paradigms can, for example, include i) the interworking of an aircraft application plane and a simulation infrastructure plane, ii) traffic segregation amongst aircraft function model traffic and simulation model traffic, and iii) segregation between a control path and a data path. For example, the control path can include information such as software simulation model control commands, and the data path can include information such as software simulation model variables and parameters. In one aspect, the aircraft application plane can include a set of software applications that can represent or simulate aircraft operational functions and signals. Similarly, the simulation infrastructure plane can include a set of software simulation models running on the aircraft system integration simulator. In one aspect, the software simulation models may be used to simulate aircraft operational functions. In addition, the data path may include the path or channel used to exchange data between software simulation models in the aircraft system integration simulator. Similarly, the control path may include the path or channel used to communicate control commands that manage the synchronization and timing of the execution of software simulation models.

Figure 1:
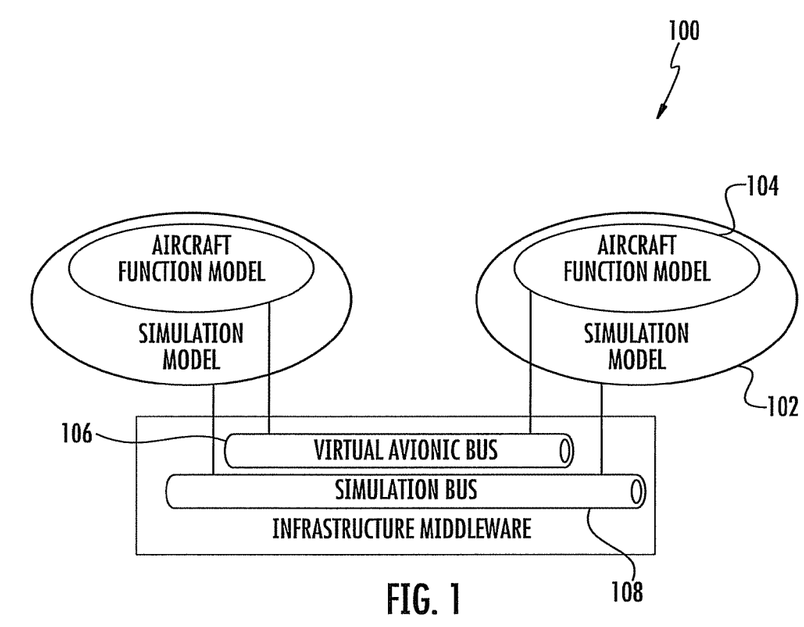
FIG. 1 is a diagram illustrating an exemplary system for segregation of traffic belonging to aircraft function model and traffic belonging to simulation models in accordance with aspects of the subject matter described herein.

FIG. 1 depicts an exemplary system generally designated 100 which can be configured to segregate traffic data associated with an aircraft function model 104 and traffic associated with a simulation model 102. As shown in FIG. 1, traffic associated with aircraft function model 104 can be connected to or communicated via a virtual avionic bus 106, and traffic associated with simulation model 102 can be connected to or communicated via a simulation bus 108. In one aspect, traffic data associated with aircraft function model 104 can belong to a simulation application, whereas traffic data associated with simulation model 102 may represent a part of the aircraft system integration simulator infrastructure provided to accomplish the simulation. Notably, virtual avionic bus 106 may be used as a data path connection that is configured to signal aircraft communications (e.g., AFDX, A429, discrete data, analog data, and the like). Similarly, simulation bus 108 may be used as i) a data path to communicate simulation variables and parameters and ii) a control path configured to communicate simulation control commands. These distinct paths may be used to facilitate communications conducted between aircraft functions (e.g., function(s) associated with a real aircraft) and software simulation models as well as communications related to time management commands used by the aircraft system integration simulator. In one aspect, aircraft functions can include real aircraft functions such as payload, wind speed, and climb rate. In another aspect, the aircraft system integration simulator can be configured to include two distinct paths for either communications conducted between aircraft functions and software simulation models, or for the communication of time management commands used by the aircraft system integration simulator.

The above-mentioned three paradigms can be used to distinguish communications among a plurality of software simulation models. In one aspect, a quality of service (QoS) paradigm can be introduced into these different communication traffics at an aircraft application level and at a simulation infrastructure level in order to characterize the communication between the software simulation models. Namely, two software simulation models can communicate with each other when their respective quality of service indicators match at both at the aircraft application level and at the simulation infrastructure level.

In order to characterize the quality of service indicator for a given software simulation model, the software simulation model can be projected onto an Open Systems Interconnection (OSI) International Standards Organization (ISO) 7 layer stack. In one aspect, quality of service indicators can include a set of quantitative and qualitative indicators representing system behavior and can be used to measure the level of services offered.

Figure 2:
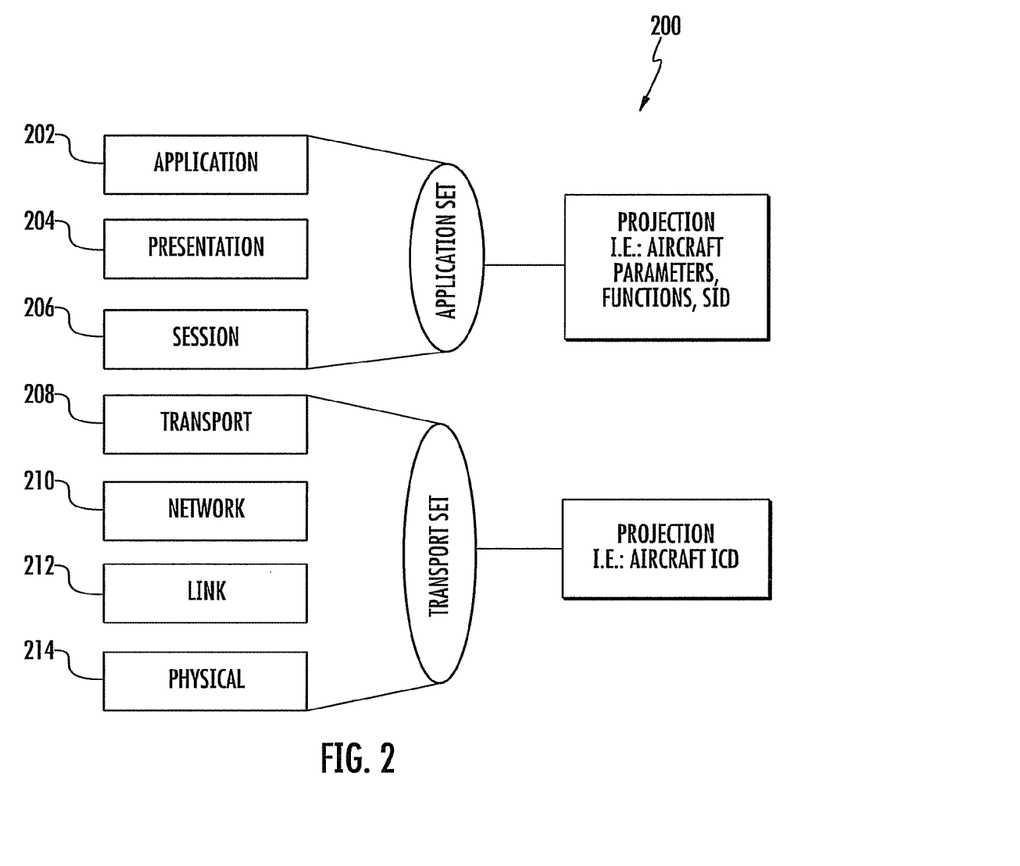
FIG. 2 is a diagram illustrating a software simulation model projected onto an OSI ISO 7 layer stack in accordance with aspects of the subject matter described herein.

FIG. 2 depicts an exemplary illustration of a software simulation model 200 projected onto an OSI ISO 7 layer stack. As shown in FIG. 2, the layer stack can include an application layer 202, a presentation layer 204, and a session layer 206 that represent the layers responsible for communications conducted at the aircraft application level. Similarly, a transport layer 208, a network layer 210, a link layer 212, and a physical layer 214 represent the layers of the OSI ISO7 layer stack that are responsible for communications conducted at the simulation infrastructure level. In one aspect, the OSI ISO 7 layer stack can be used as a reference for mapping information contained in data exchanged between software simulation models within the aircraft system integration simulator because the layers can be utilized to group a common set of functional properties for a software simulation model. For example, a projection of a software simulation model onto the OSI ISO 7 layer stack makes possible for a software simulation model to negotiate for communication first at the simulation infrastructure level, then again at the aircraft application level. As used herein, the term "projecting" includes categorizing/formatting one or more characteristics associated with a software simulation model to one or more of the OSI ISO 7 layers.

Figure 3:
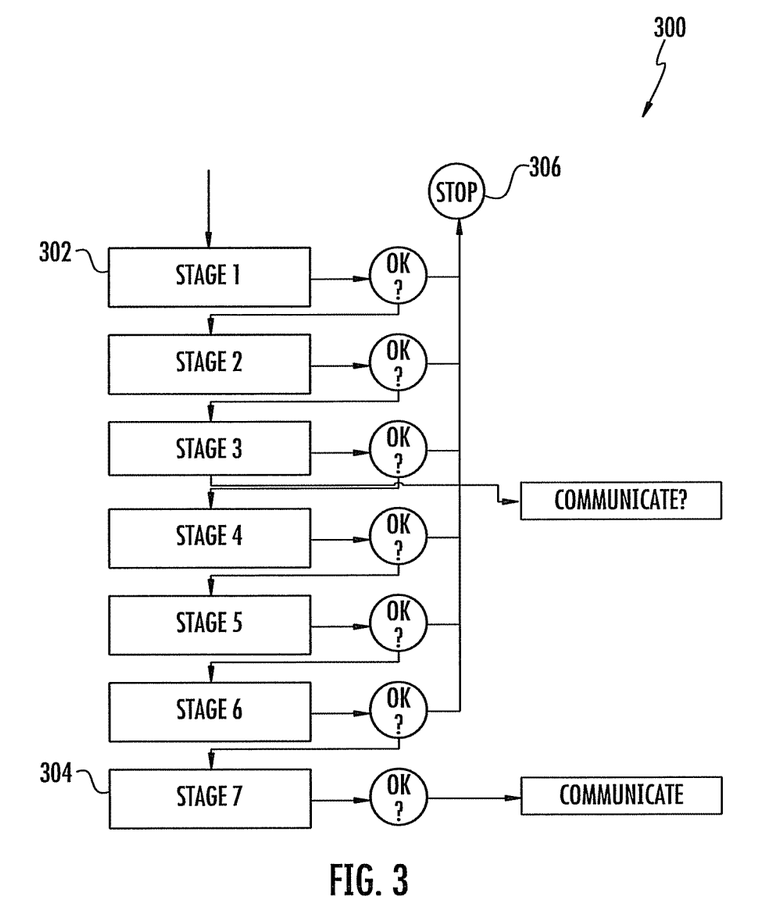
FIG. 3 is a diagram illustrating an exemplary software simulation model conducting a communication negotiation with another software simulation model in a top down fashion, going down the OSI ISO 7 layer stack in accordance with aspects of the subject matter described herein.

FIG. 3 depicts an exemplary system 300 that includes a first software simulation model conducting a communication negotiation with a second software simulation model in a top down fashion, i.e., traversing down the OSI ISO 7 layer stack in a descending manner. As shown in FIG. 3, a software simulation model can negotiate for communication in all seven stages, proceeding from a top Stage 1 302 (e.g., at the application level) down to the most detailed Stage 7 304 (e.g., at the physical level). Furthermore, according to one aspect, a subscriber program can continue or stop (see node 306 in FIG. 3) the negotiation process at any of the seven stages.

In addition, in a data centric time decoupled environment such as Data Distribute Service (DDS), software simulation models can enter or leave at any point in time. For example, the aircraft system integration simulator can utilize a time decoupled system such as the DDS to conduct a simulation which lasts for several hours, during which a software simulation model can be called to join the simulation at a period of time (e.g., for an hour) to simulate a specific function or property, such as a particular geographical topography. The software simulation model can utilize the DDS's publish subscribe and discovery algorithm to provide inputs required by the aircraft system integration simulator and then supply the output back to the aircraft system integration simulator. Thus, the seven stage negotiation is considered dynamic because software simulation models are unaware of their respective communication capabilities beforehand, but proceed with the seven stage negotiation. At aircraft system integration simulator startup time and in the event a software simulation model joins the aircraft system integration simulator (e.g., the simulation domain), the negotiation takes place from both the data path and the control path.

Figure 4:
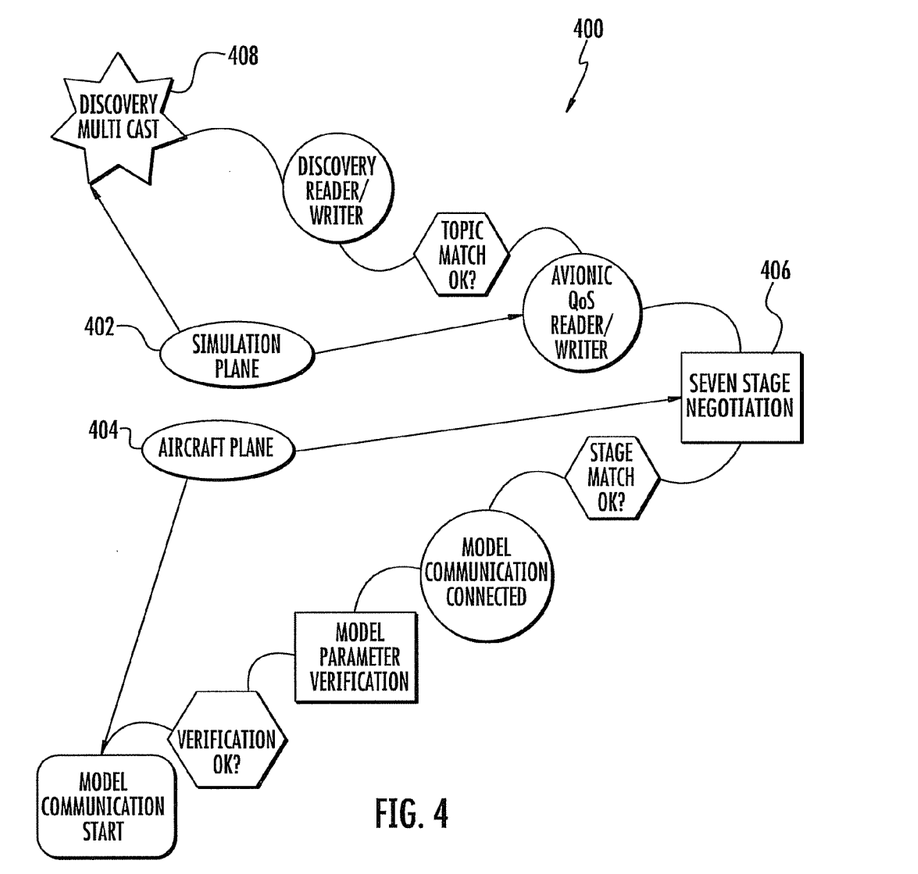
FIG. 4 is a flow diagram illustrating an exemplary process for enabling a quality of service indicator comparison between software simulation models from the aircraft application plane and the simulation infrastructure plane in accordance with aspects of the subject matter described herein.

FIG. 4 is a flow diagram illustrating an exemplary process 400 for enabling a quality of service indicator comparison between software simulation models from an aircraft application plane 402 and a simulation infrastructure plane 404. According to one aspect, Data Distributed Service (DDS) from Object Management Group (OMG) can be used as middleware to initiate a communication with the software simulation models. For example, a discovery multi cast command 408 can be initiated by the DDS by utilizing a DDS's publish subscribe and discovery algorithm to initiate a seven stage negotiation command 406 based upon comparing the quality of service indicators associated with the software simulation models.

Figure 5:
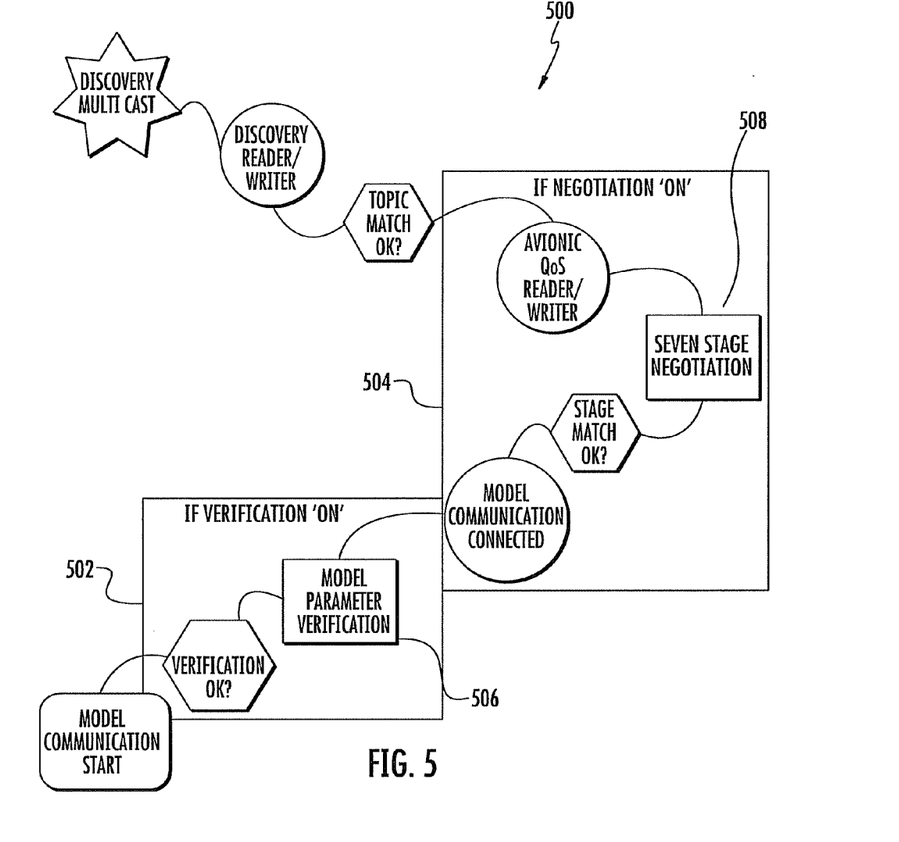
FIG. 5 is an exemplary illustration of a software simulation model parameter verification and negotiation process in accordance with aspects of the subject matter described herein.

FIG. 5 is a flow diagram illustrating an exemplary process 500 that includes a subscriber program that is configured to decide if the verification and negotiation of a software simulation model's parameters should be conducted/performed. As shown in FIG. 5, a verification phase 502 can include a model parameter verification step 506, and a negotiation phase 508 can include a Seven Stage Negotiation step 508. According to one aspect, both the verification phase 502 and the negotiation phase 508 can be conditional to reduce start up time of the overall simulation infrastructure. For example, negotiation records can be stored for one or more software simulation models, and such negotiation records can be recalled during subsequent aircraft system integration simulator startups. Notably, recalling stored negotiation records during a subsequent simulation startup eliminates the need to perform an additional negotiation and verification process and reduces aircraft system integration simulator restart time.

Figure 6:
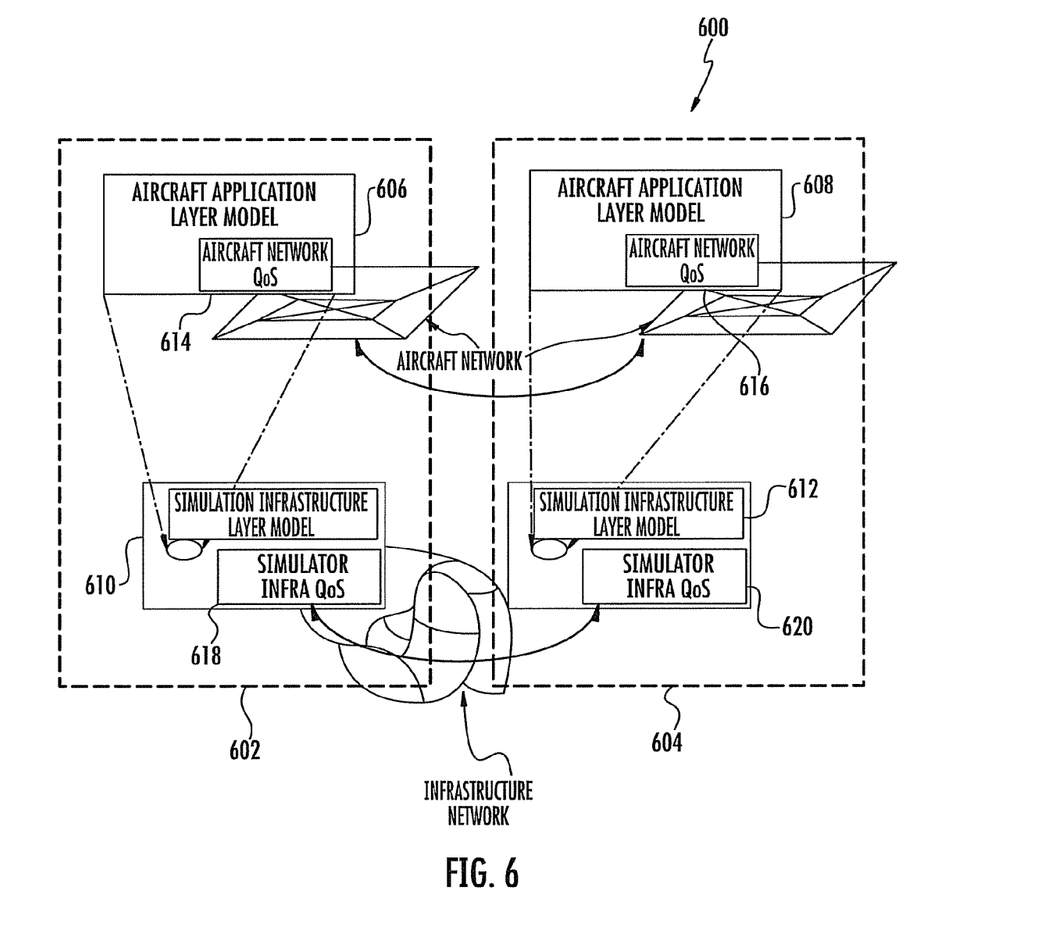
FIG. 6 is a diagram illustrating a system comprising a plurality of software simulation models in accordance with aspects of the subject matter described herein.

FIG. 6 is an exemplary system 600 illustrating the matching of quality of service indicators on separate planes. Specifically, system 600 includes a first software simulation model 602 and a second software simulation model 604. Software simulation model 602 can comprise a simulation infrastructure layer model 610 (which can include a simulator infrastructure quality of service indicator 618) and an aircraft application layer model 606 (which can include an aircraft network quality of service indicator 614). Similarly, software simulation model 602 can comprise a simulation infrastructure layer model 612 (which can include a simulator infrastructure quality of service indicator 620) and an aircraft application layer model 608 (which can include an aircraft network quality of service indicator 616). In one aspect, software simulation models 602 and 604 are matched at both the aircraft application model plane and the simulation model plane. For example, the two software simulation models 610 and 612 are capable of communicating with each other. As shown in FIG. 6, the two simulator infrastructure QoS indicators 618 and 620 are compared and matched and the two aircraft net QoS indicators 614 and 616 are compared and matched. Therefore, software simulation models 602 and 604 can communicate with each other via the illustrated aircraft network plane and the infrastructure network plane.

Figure 7:
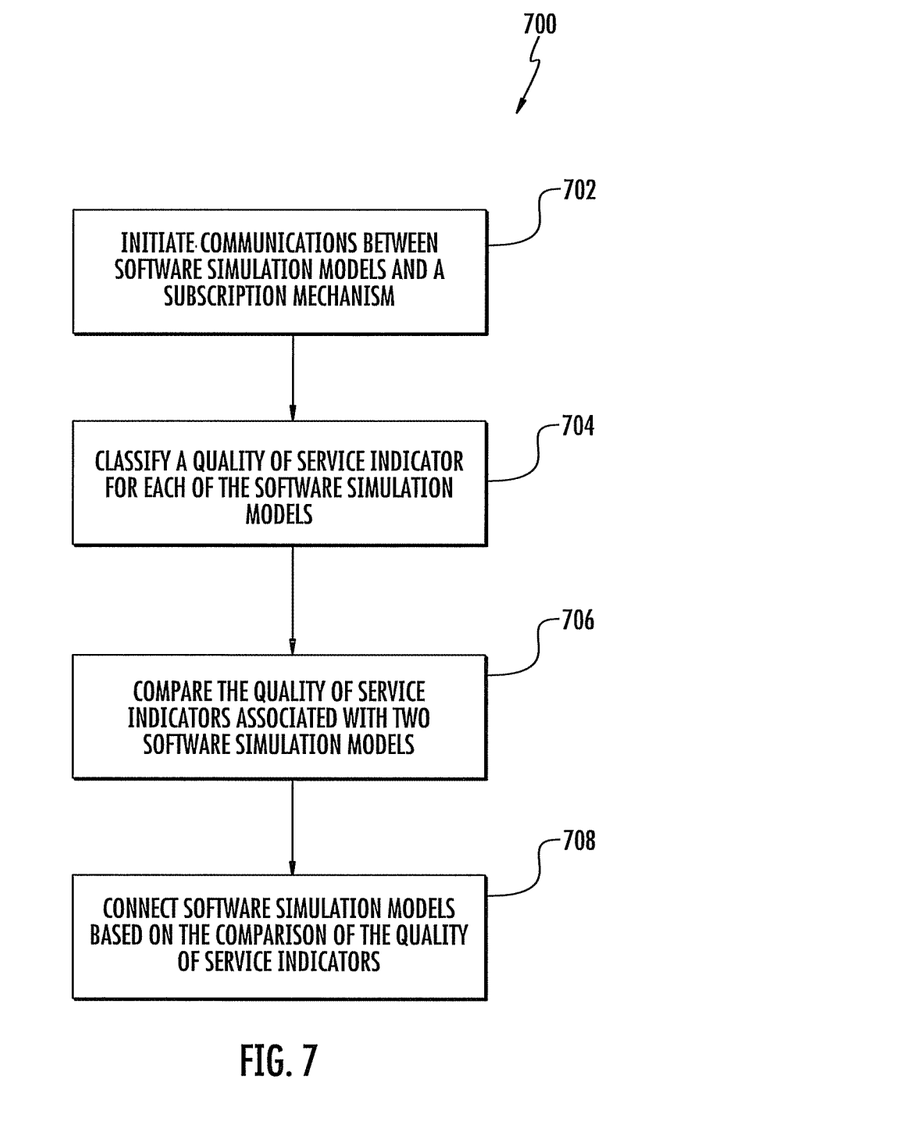
FIG. 7 is a flow chart illustrating an exemplary method for establishing a communication link between software simulation models in accordance with aspects of the subject matter described herein.

FIG. 7 is a flow chart illustrating an exemplary method 700 for establishing a communication link between software simulation models in accordance with embodiments of the subject matter described herein. In step 702, communications between software simulation models and a subscription mechanism can be initiated. For example, a publish subscribe mechanism (e.g., Data Distributed Service (DDS) from Object Management Group (OMG)) can be implemented to establish an initial contact with a plurality of software simulation models. For example, a discovery multi cast command can be initiated by the DDS to initiate a seven stage negotiation between two software simulation models. In one embodiment, DDS can utilize an object that is built on a template comprising a default subscriber reader and publisher writer routines that can answer initial discovery multi cast requests.

At step 704, a quality of service indicator for each of the software simulation models can be classified. In one aspect, this step can be achieved, for example, by first projecting the software simulation models onto an Open Systems Interconnection International Standards Organization 7 layer stack. Quality of Service (QoS) indicators can include a set of quantitative and qualitative indicators representing system behavior and can be used to measure or quantify the level of services offered to a user. For example, QoS indicators can provide a means for estimating the level of the services through an interactive process that involves communication components and demanding users. According to one aspect, the OSI ISO 7 layer stack can be used as a reference for mapping information contained in data exchanged between software simulation models within the aircraft system integration simulator, because the layers can be utilized as a common set of functional properties for a software simulation model. In addition, projection of a software simulation model onto the OSI ISO 7 layer stack allows for a software simulation model to initially negotiate for communication at the simulation infrastructure level and subsequently at the aircraft application level. The lower layer levels of the communication stack can be the layers responsible for formatting aircraft data to the transport protocol used to transfer a signal onboard the aircraft. Exemplary transport protocols include, for example, Arinc429 or AFDX. The hierarchy established between layers facilitates the classification of the service from high level abstractions to lower level abstractions. For the software simulation models, the classification may entail proceeding from a coarse detail level of modeling to a more detailed level of modeling for the same domain of use. For example, at the coarse detail level, two software simulation models may exchange an aircraft parameter inside an integer, which in turn may reside inside a message. In contrast, at the more detailed level, the software simulation models may exchange the same parameter inside a complex A429 label.

After the projection of a software simulation model onto the OSI ISO 7 layer stack and the quality of service indicators are implemented in the application, software simulation models can negotiate their communication in seven stages, proceeding from the top application level down to the most detailed physical level. According to one aspect, a subscriber program within the publish subscribe mechanism can be configured to continue or stop the QoS indicator negotiation at any of the seven stages. Moreover, the subscriber program can be configured to determine whether it can communicate at a particular level/layer that is available to a publisher program within the publish subscribe mechanism. This determination enables the subscriber program the capability to support communication at more than one stage of the hierarchy.

In addition, in a data centric time decoupled environment such as DDS, software simulation models can enter or leave the domain at any point in time. For example, the aircraft system integration simulator can utilize a time decoupled system such as the DDS to conduct a simulation which lasts for an extended time period (e.g., several hours), during which a software simulation model can be called to join the simulation at any time (e.g., an hour) to simulate a specific function or property such as a particular geographical topography. The software simulation model can utilize the DDS's publish subscribe and discovery algorithm to provide inputs required by the aircraft system integration simulator and then supply the output to the aircraft system integration simulator. Thus, the seven stage negotiation is considered dynamic because software simulation models are unaware of their respective communication capabilities beforehand, but proceed with the seven stage negotiation at times such as during an aircraft system integration simulator's startup time, or in the event a software simulation model joins the aircraft system integration simulator (e.g., the simulation domain). Furthermore, a QoS indicator negotiation process can occur at the simulation infrastructure level. Namely, the QoS indicator negotiation can be used to analyze the activities of the software simulation models. For example, the QoS indicator negotiation process can check an attribute value and an appropriate layer level of a software simulation model. If the QoS indicator level is not a match, the negotiation attempt terminates and sends a message to a higher OSI layer indicating that the requested QoS indicator is not supported. For instance, the subscriber model can proceed with communication at the higher successfully negotiated OSI layer. Notably, if the negotiation attempt is performed at the uppermost "application" layer, this may be an indication that the subscriber model cannot join the simulation because the subscriber model did not find its required inputs. In addition, a subsequent QoS indicator negotiation process can occur at the aircraft application level.

At step 708, the software simulation models can be connected via a communications link based on a comparison of their respective quality of service indicators. In one aspect, the quality of service indicator associated with each of the software simulation models can be compared. If the quality of service indicators match at both the aircraft application level and at the simulation infrastructure level a communication link between the two respective software simulation models may be established. In one aspect, the communication link may be facilitated by the DDS. Namely, a publish subscribe and discovery algorithm within the DDS can be utilized to establish such communication link.

According to another aspect, for QoS implementation specific to aircraft system integration simulators, both formatted and pre-formatted variables can be transported. For example, pre-formatting variables can be assembled into a pre-formatted payload and can be a way to optimize the transport of aircraft functional variables. In one aspect, aircraft functional variables can include real aircraft functional data such as payload, wind speed, and climb rate. For example, a formatted variable can be an aircraft parameter that is transported in the simulation in the same format as it would be on the aircraft communication protocols, such as AFDX and Arinc429. A pre-formatted variable can be an aircraft parameter expressed by an operational physical unit (e.g., meter, kilo-tons, etc.). To optimize the transportation of aircraft functional variables, discrete signals can be assembled into data type integers to conserve transport bandwidths. For example, a pre-formatted variable can include a set of discrete signals into an integer, such as including 32 discrete signals into a 32-bit integer. In one aspect, this pre-formatting of variables can be considered a protocol definition. Accordingly, the pre-formatted definition can be a protocol at the aircraft application level and can be handled as such in the negotiation.

Figure 8:
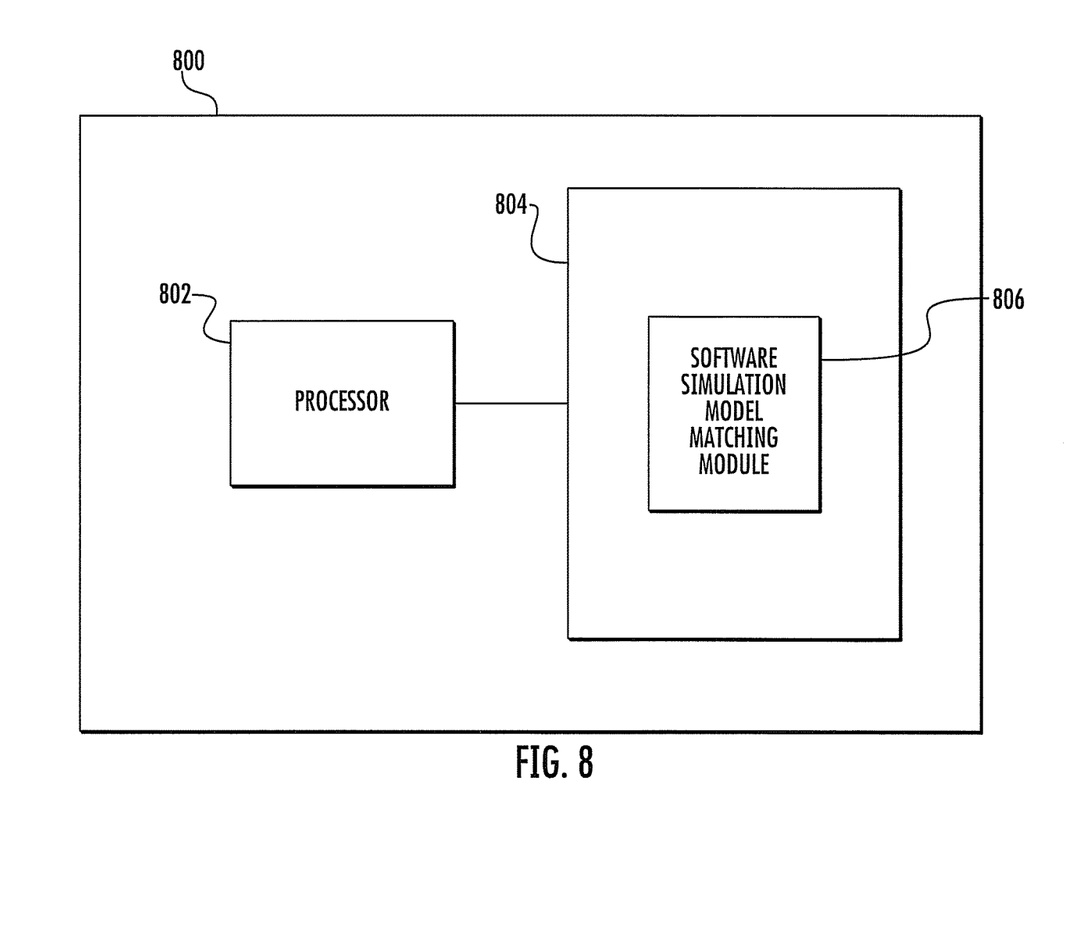
FIG. 8 is a block diagram illustrating an exemplary system for establishing a communication link between software simulation models in accordance with aspects of the subject matter described herein.

FIG. 8 is a block diagram illustrating an exemplary system for establishing a communication link between software simulation models in accordance with embodiments of the subject matter described herein. Referring to FIG. 8, a system 800 can comprise a hardware-based processor 802 and a memory unit 804. Memory unit 804 can contain one or more software- or firmware-based modules for execution by processor 802. For example, memory unit 804 can contain a software simulation model matching module 806, which can be configured to initiate communications between software simulation models and a publish subscribe mechanism, classify a quality of service indicator for each of the software simulation models, compare the quality of service indicators associated with two software simulation models, and connect the software simulation models via a communication link based on the comparison of the quality of service indicators.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for establishing a communication link between software simulation models, the method comprising:
   initiating communication between software simulation models and a publish subscribe mechanism;
   classifying a quality of service indicator for each of the software simulation models, wherein classifying the quality of service indicator for each of the software simulation models comprises projecting each of the software simulation models onto an Open Systems Interconnection (OSI) International Standards Organization (ISO)-7 layer standard, wherein at least one of the projected software simulation models is classified into a seven layered stack;
   comparing the quality of service indicators associated with the software simulation models, wherein comparing the quality of service indicators comprises initializing a multi cast command by the publish subscribe mechanism and negotiating a communication between the software simulation models at a simulation infrastructure level, wherein a subscriber program stops the negotiation at any of the layers of the seven layered stack; and
   connecting the software simulation models via the communication link based on the comparison of the quality of service indicators.

2. The method of claim 1, wherein each layer of the seven layered stack defines a common set of functional properties for the software simulation models.

3. The method of claim 1, further comprising negotiating a communication between the software simulation models at an aircraft application level.

4. The method of claim 1, wherein negotiating the communication is performed by traversing the OSI ISO-7 layer stack in a descending manner.

5. The method of claim 1, further comprising saving a negotiation record of the software simulation models.

6. The method of claim 1, wherein the software simulation models are configured to simulate one or more aircraft operational functions.

7. The method of claim 1, wherein connecting the software simulation models based on the quality of service indicators comprises connecting the software simulation models in an event the quality of service indicators match.

8. The method of claim 7, wherein the quality of service indicators match at an aircraft application level and at the simulation infrastructure level.

9. A system for establishing a communication link between software simulation models, the system comprising:
- a memory unit;
- a processor configured to execute a software model matching module stored in the memory unit; and
- a software simulation model matching module that initiates communications between the software simulation models and a publish subscribe mechanism, classifies a quality of service indicator for each of the software simulation models, projects each of the software simulation models onto an Open Systems Interconnection (OSI) International Standards Organization (ISO)-7 layer standard, wherein at least one of the projected software simulation models is classified into a seven layered stack, compares the quality of service indicator associated with two software simulation models, wherein the comparison of the quality of service indicator comprises initializing a multi cast command by the publish subscribe mechanism, negotiates a communication between the software simulation models at a simulation infrastructure level, wherein a subscriber program stops the negotiation at any of the layers of the seven layered stack, and connects the software simulation models via the communication link based on the comparison of the quality of service indicators.

10. The system of claim 9, wherein each layer of the seven layered stack defines a common set of functional properties for the software simulation models.

11. The system of claim 9, wherein the software simulation model matching module further negotiates a communication between the software simulation models at an aircraft application level.

12. The system of claim 9, wherein the software simulation model matching module further negotiates the communication by traversing the OSI ISO-7 layer stack in a descending manner.

13. The system of claim 9, wherein the software simulation model matching module further saves a negotiation record of the software simulation models.

14. The system of claim 9, wherein the software simulation models simulate aircraft operational functions.

15. The system of claim 9, wherein the software simulation model matching module further connects the software simulation models in an event the quality of service indicators match.

16. The system of claim 15, wherein the quality of service indicators match at an aircraft application level and at the simulation infrastructure level.

17. A non-transitory computer readable medium having stored thereon executable instructions that when executed by a processor of a computer control the computer to perform steps, the steps comprising:
- initiating communication between software simulation models and a publish subscribe mechanism;
- classifying a quality of service indicator for each of the software simulation models, wherein classifying the quality of service indicator for each of the software simulation models comprises projecting each of the software simulation models onto an Open Systems Interconnection (OSI) International Standards Organization (ISO)-7 layer standard, wherein at least one of the projected software simulation models is classified into a seven layered stack;
- comparing the quality of service indicators associated with the software simulation models, wherein comparing the quality of service indicators comprises initializing a multi cast command by the publish subscribe mechanism and negotiating a communication between the software simulation models at a simulation infrastructure level, wherein a subscriber program stops the negotiation at any of the layers of the seven layered stack; and
- connecting the software simulation models via a communications link based on the comparison of the quality of service indicators.

18. A method for establishing a communication link between software simulation models, the method comprising:
- initiating communication between software simulation models and a publish subscribe mechanism;
- classifying a quality of service indicator for each of the software simulation models, wherein classifying the quality of service indicator for each of the software simulation models comprises projecting each of the software simulation models onto an Open Systems Interconnection (OSI) International Standards Organization (ISO)-7 layer standard, wherein at least one of the projected software simulation models is classified into a seven layered stack;
- comparing the quality of service indicators associated with the software simulation models, wherein comparing the quality of service indicators comprises initializing a multi cast command by the publish subscribe mechanism and negotiating a communication between the software simulation models at a simulation infrastructure level;
- saving a negotiation record of the software simulation models; and
- connecting the software simulation models via the communication link based on the comparison of the quality of service indicators.

19. A system for establishing a communication link between software simulation models, the system comprising:
- a memory unit;
- a processor configured to execute a software model matching module stored in the memory unit; and
- a software simulation model matching module that initiates communications between the software simulation models and a publish subscribe mechanism, classifies a quality of service indicator for each of the software simulation models, projects each of the software simulation models onto an Open Systems Interconnection (OSI) International Standards Organization (ISO)-7 layer standard, wherein at least one of the projected software simulation models is classified into a seven layered stack, compares the quality of service indicator associated with two software simulation models, wherein the comparison of the quality of service indicator comprises initializing a multi cast command by the publish subscribe mechanism, negotiates a communication between the software simulation models at a simulation infrastructure level, saves a negotiation record of the software simulation models, and connects the software simulation models via the communication link based on the comparison of the quality of service indicators.

20. A non-transitory computer readable medium having stored thereon executable instructions that when executed by a processor of a computer control the computer to perform steps, the steps comprising:

initiating communication between software simulation models and a publish subscribe mechanism;

classifying a quality of service indicator for each of the software simulation models, wherein classifying the quality of service indicator for each of the software simulation models comprises projecting each of the software simulation models onto an Open Systems Interconnection (OSI) International Standards Organization (ISO)-7 layer standard, wherein at least one of the projected software simulation models is classified into a seven layered stack;

comparing the quality of service indicators associated with the software simulation models, wherein comparing the quality of service indicators comprises initializing a multi cast command by the publish subscribe mechanism and negotiating a communication between the software simulation models at a simulation infrastructure level;

saving a negotiation record of the software simulation models; and connecting the software simulation models via a communications link based on the comparison of the quality of service indicators.

\* \* \* \* \*